United States Patent
Doshi et al.

(10) Patent No.: US 10,481,817 B2
(45) Date of Patent: Nov. 19, 2019

(54) METHODS AND APPARATUS TO OPTIMIZE DYNAMIC MEMORY ASSIGNMENTS IN MULTI-TIERED MEMORY SYSTEMS

(71) Applicant: Intel Corporation, Santa Clara, CA (US)

(72) Inventors: Kshitij Doshi, Tempe, AZ (US); Andreas Kleen, Portland, OR (US); Harshad Sane, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/022,339

(22) Filed: Jun. 28, 2018

(65) Prior Publication Data

US 2019/0042124 A1    Feb. 7, 2019

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/0653* (2013.01); *G06F 3/0656* (2013.01); *G06F 3/0683* (2013.01); *G06F 9/5016* (2013.01)

(58) Field of Classification Search
CPC ..... G06F 3/0631; G06F 3/0653; G06F 3/0656
USPC ........................................................ 711/170
See application file for complete search history.

(56) References Cited

U.S. PATENT DOCUMENTS

| | | | | |
|---|---|---|---|---|
| 7,376,808 | B2 * | 5/2008 | Cascaval | G06F 12/10 703/13 |
| 2004/0215880 | A1 * | 10/2004 | Chilimbi | G06F 12/0802 711/118 |
| 2007/0180215 | A1 * | 8/2007 | Cascaval | G06F 12/10 711/202 |
| 2012/0144167 | A1 * | 6/2012 | Yates, Jr. | G06F 9/30174 712/216 |

OTHER PUBLICATIONS

Zeng et al., "DeltaPath: Precise and Scalable Calling Context Encoding," Proceedings of Annual IEEE/ACM International Symposium on Code Generation and Optimization, Feb. 15-19, 2014, 13 pages.

(Continued)

*Primary Examiner* — Than Nguyen
(74) *Attorney, Agent, or Firm* — Hanley, Flight & Zimmerman, LLC (57) ABSTRACT

Methods, apparatus, systems and articles of manufacture to optimize dynamic memory assignments in multi-tiered memory systems are disclosed. An example computer readable storage medium comprises instructions to, during an offline profiling run of a computer application: responsive to a first malloc function call, perform a first backtrace to identify a first path preceding the first malloc function call and identify a size of a buffer in memory allocated to the first path; and determine an indicator corresponding to a temperature of the buffer allocated to the first path; and during runtime: responsive to a second malloc function call, perform a second backtrace to identify a second path preceding the second malloc function call; and responsive to the second path corresponding to the first path, allocate memory from a tier of memory based on the indicator.

20 Claims, 6 Drawing Sheets

(56) References Cited

OTHER PUBLICATIONS

Li et al., "Dynamic and Adaptive Calling Context Encoding," Proceedings of Annual IEEE/ACM International Symposium on Code Generation and Optimization, Feb. 15-19, 2014, 14 pages.
Bond et al., "Probabilistic Calling Context," Oct. 21-25, 2007, OOPSLA'07, 15 pages.
Sumner et al., "Precise Calling Context Encoding," ICSE '10, May 2-8, 2010, Cape Town, South Africa, 10 pages.

* cited by examiner

METHODS AND APPARATUS TO OPTIMIZE DYNAMIC MEMORY ASSIGNMENTS IN MULTI-TIERED MEMORY SYSTEMS

FIELD OF THE DISCLOSURE

This disclosure relates generally to memory allocations, and, more particularly, to methods and apparatus to optimize dynamic memory assignments in multi-tiered memory systems.

BACKGROUND

In recent years, software structures have changed, allowing dynamic memory allocations during runtime execution of an application or program. For example, instead of static memory allocation (e.g., allocations in main memory that persists for the lifetime of the program), dynamic-memory allocation manages memory by allocating the memory from a free store (e.g., an area of memory structured for such a purpose). The library function "malloc" may be called to allocate a block of memory from the free store. The malloc function call (e.g., malloc call) allocates memory during runtime and returns a pointer to the allocated memory. When the memory is no longer needed, the pointer can be freed, which deallocates the memory so that it can be used for other purposes.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Malloc is a function used in software engineering for dynamically allocating memory (e.g., allocating memory at run time). For example, when a malloc function is called at runtime, the function allocates a block of memory and returns a pointer corresponding to the allocated block of memory. When the memory is no longer needed, the pointer is passed to free which deallocates the memory so that it can be used for other purposes. The memory that is allocated based on a call for a malloc (e.g., a malloc function call) may be from a single tier of memory or from multiple tiers of memory.

Multiple tiered memory systems include various types of memory for use. For example, a three tiered system may include a first tier (e.g., a performance tier) including high bandwidth memory (HBM) for storing data with lower latency and higher bandwidth, a second tier (e.g., an intermediate tier) including double data rate (DDR) memory for storing data with medium latency and medium bandwidth, and a third tier (e.g., a capacity tier) including lower main memory for storing data with high latency and lower bandwidth. Other memory may be structured in any number of tiers based on the structure/components of the memory.

When multiple tiers of memory are available, it may be desirable to place certain types of data (e.g., hot/popular paths) in higher tiers (e.g., tiers corresponding to lower latency and higher bandwidth) and other types of data (e.g., cold/unpopular paths) into lower tiers. For example, it is desirable for malloc to return memory in a higher tier when the memory that is being allocated (through malloc) is accessed frequently (e.g., is used for hot data objects). Additionally, it is desirable for malloc to return memory in a lower tier when such memory is used for infrequently accessed (e.g., cold data) objects. A function path preceding a malloc function call may be indicative of the purpose for the malloc function call. Additionally, it the path preceding the malloc function call is indicative of how frequently the allocated memory will be accessed in the program. Accordingly, the path of functions preceding a malloc function call may be associated with a temperature (e.g., a measure of the frequency) that is indicative of the accesses likely to be generated by the program to the memory that the program allocated using a path.

Examples disclosed herein allocate memory buffers, when a malloc is called, based on the temperature (e.g., hot, warm, cold, etc.) of the function path preceding the malloc function call. As used herein, a path is "hot" when memory allocated by the function path preceding the malloc function call is being used by the program with a high frequency, a path is "cold" when memory allocated by the function path preceding the malloc function call is being used by the program with a low frequency, and a path is "warm" when memory allocated by the function path preceding the malloc function call is being used by the program with a medium frequency (e.g., between the high frequency and the low frequency). Accordingly, the temperature of the path preceding a malloc corresponds to the number of bytes that are read and/or written in the allocated memory (e.g., hotter paths correspond to a high reference/byte ratios). Said another way, the temperature corresponds to an indicator of the popularity of buffers malloced by a path.

Most programs (e.g., software instructions, applications, etc.) allocate memory through malloc or some variant of malloc or a thin wrapper around malloc, and multiple different subroutines paths lead to such malloc function calls. In conventional systems, if software is implemented to break down different data (e.g., metadata) types into temperature information (e.g., different categories of "hotness," or frequency of use), encoding the temperature information into program structure would be challenging because of modularity and layering of responsibilities in software. It is not uncommon that code paths by which hotter allocations occur overlap to varying degrees those by which colder code paths occur. Thus, it may be difficult in such convention systems to know, close to the invocation of a malloc function call, what type of access density the allocation should receive.

Examples disclosed herein establish path temperatures (e.g., the set of code paths by which hot/warm/cold dynamic buffers get allocated at malloc) offline and allocate memory based on the path temperatures and memory capacity during runtime, thereby increasing the efficiency of a malloc function and the performance of software execution. Additionally, examples disclosed herein monitor, during runtime, path-buffer associations to be able to dynamically balance memory based on runtime path-buffer associations.

As used herein, a buffer temperature is the average fraction of accesses received by a malloced buffer relative to the size of a malloced buffer (e.g., normalized to the total numbers of accesses across all malloced buffers).

As used herein, a path temperature is a real value over the interval [0,1] that is proportional to a capacity-normalized number of references to all buffers allocated via an allocated path. The proportionality constant is chosen so that the sum of the path temperatures is approximately 1.

When a path reaches malloc, a backtrace is performed before the call to malloc identifying vertices (e.g., functions) on path P. As used herein, for any given pair of vertices, v1 and v2, on path P, v2 is the outer vertex if v2 is closer to the invocation of malloc than v1 and v1 is the inner vertex relative to v2.

As used herein, a pathset of vertex u (e.g., Pathset(u)) is the set S of paths such that u is a vertex on each path in S.

As used herein, markers correspond to a group of vertices for a path P, if path P is the only path that can pass through the vertices, and removal of one of the vertices from the group means that it is not possible to determine whether path P is the only path that passes through the reduced group.

As used herein, a marker codes path signature is any code suitable for Bloom-Filters (e.g., murmurhash3)) signature computed over the marker codes for the markers that collectively identify path P.

As used herein, an intersection set (e.g., I(P1,P2)) is all vertices that both paths (e.g., P1 and P2) contain.

As used herein, RSP is a stack pointer and per-thread path signature variable (e.g., V(RSP)) is a stackbase address that is reserved for holding the per-thread path signature. In some example V(RSP) may be a reserved variable that is in thread local storage.

As used herein, a buffer tag is a signature that is associated with a malloced buffer to track the path by which the buffer was allocated. In some examples disclosed herein, the buffer tag is needed for offline path popularity estimation and dynamic path population tracking (e.g., when enabled). The buffer tags may be maintained by a side index/hash or by using metadata capabilities in a memory allocator.

As used herein, path longevity is the average longevity of a buffer malloced by a path. The path longevity is table drive or coded selections that map from a given path temperature to an allocation tier. Tier selector function F2 takes into account both the path temperature and the capacity vector across tiers (e.g., F2 performs a capacity informed tier selection for a given level of popularity) and F3 considers, in addition to capacity, the average lifetime of buffers allocated by the path (e.g., time×space product).

Figure 1:
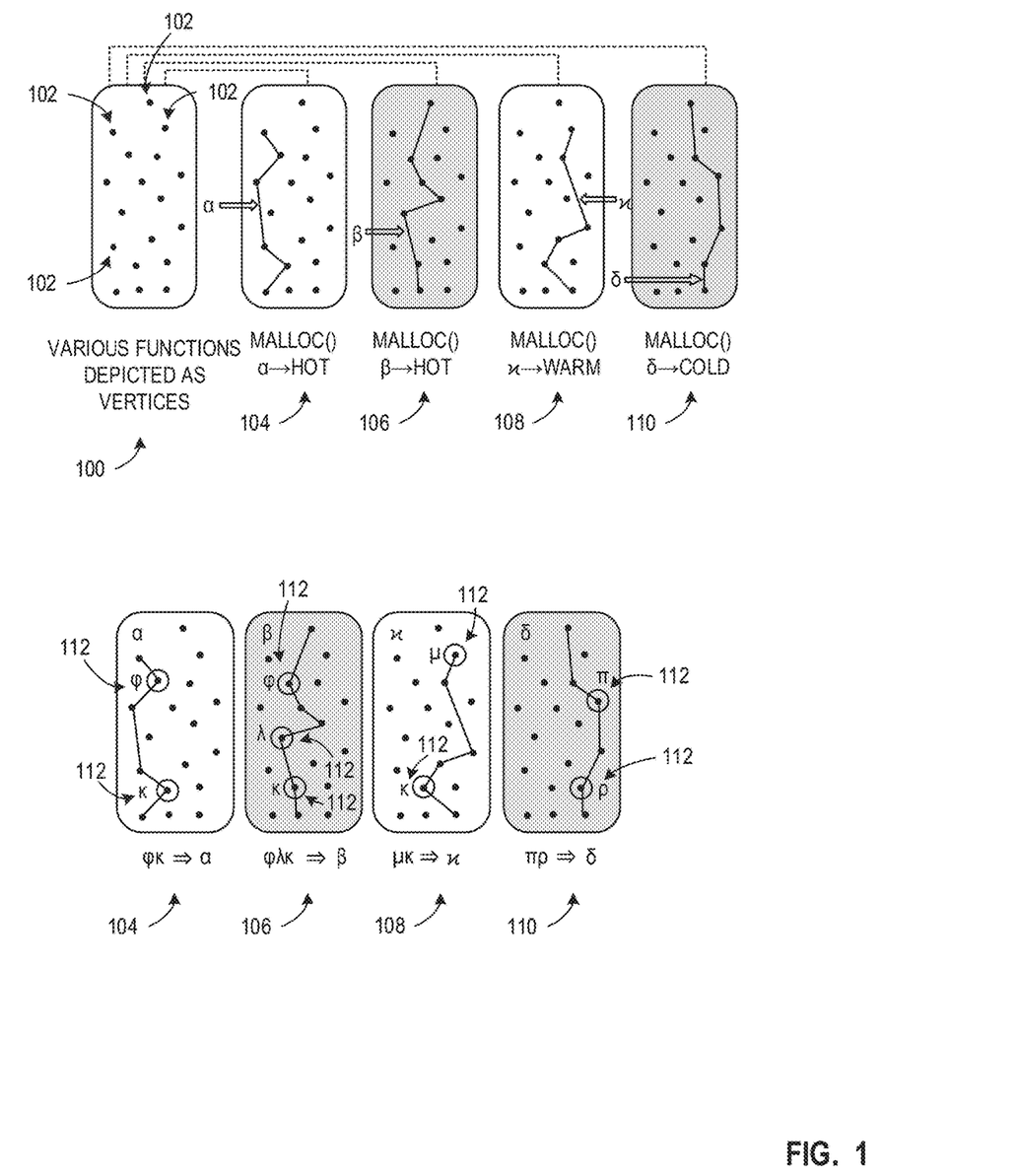
FIG. 1 is an illustration of various paths of functions that may be executed in software during runtime prior to calling a malloc function and corresponding temperatures of the various paths.

FIG. 1 is an illustration of various paths of functions that may be executed in software during runtime prior to calling a malloc function and corresponding temperatures of the various paths. FIG. 1 includes an example program/application 100 includes example functions 102, example paths 104, 106, 108, 110 corresponding to different temperatures, and example markers 112 used to distinguish the different paths 104, 106, 108, 110.

The example program/application 100 of FIG. 1 represents software instructions including various functions 102 depicted as vertices. During run-time, the function will execute according to one of the paths 104, 106, 108, 110 when a malloc function is called. The malloc function allocates memory and returns a pointer corresponding to the allocated memory. Based on offline profiling run(s), the first example path 104 is identified as a hot path, the second example path 106 is identified as a hot path, the third example path 108 is identified as a warm path, and the fourth example path 110 is identified as a cold path. The temperature does not correspond to how frequently these paths malloc; rather, the temperature corresponds to how frequently the byes that the paths malloc are touched (e.g., read or written into). How the temperatures are determined is further described below in conjunction with FIG. 2.

The example markers 112 of FIG. 1 correspond to code locations (e.g., signatures) on the example paths 104, 106, 108, 110 that are sufficient for knowing the paths. In this manner, during runtime, if a path passes through markers π and ρ on its way to malloc, examples disclosed herein can identify the path as path 110. Because during the offline profile runs, path 110 was identified as cold, examples disclosed herein can also identify that the path corresponding to markers π and ρ is a cold path. Accordingly, the malloc can allocate low tier memory based on the identification of the cold path. The automated code transformation to generate path signatures that can be looked up to find buffer allocation temperature at run time for memory tier selection is further described below in conjunction with FIG. 2.

Figure 2:
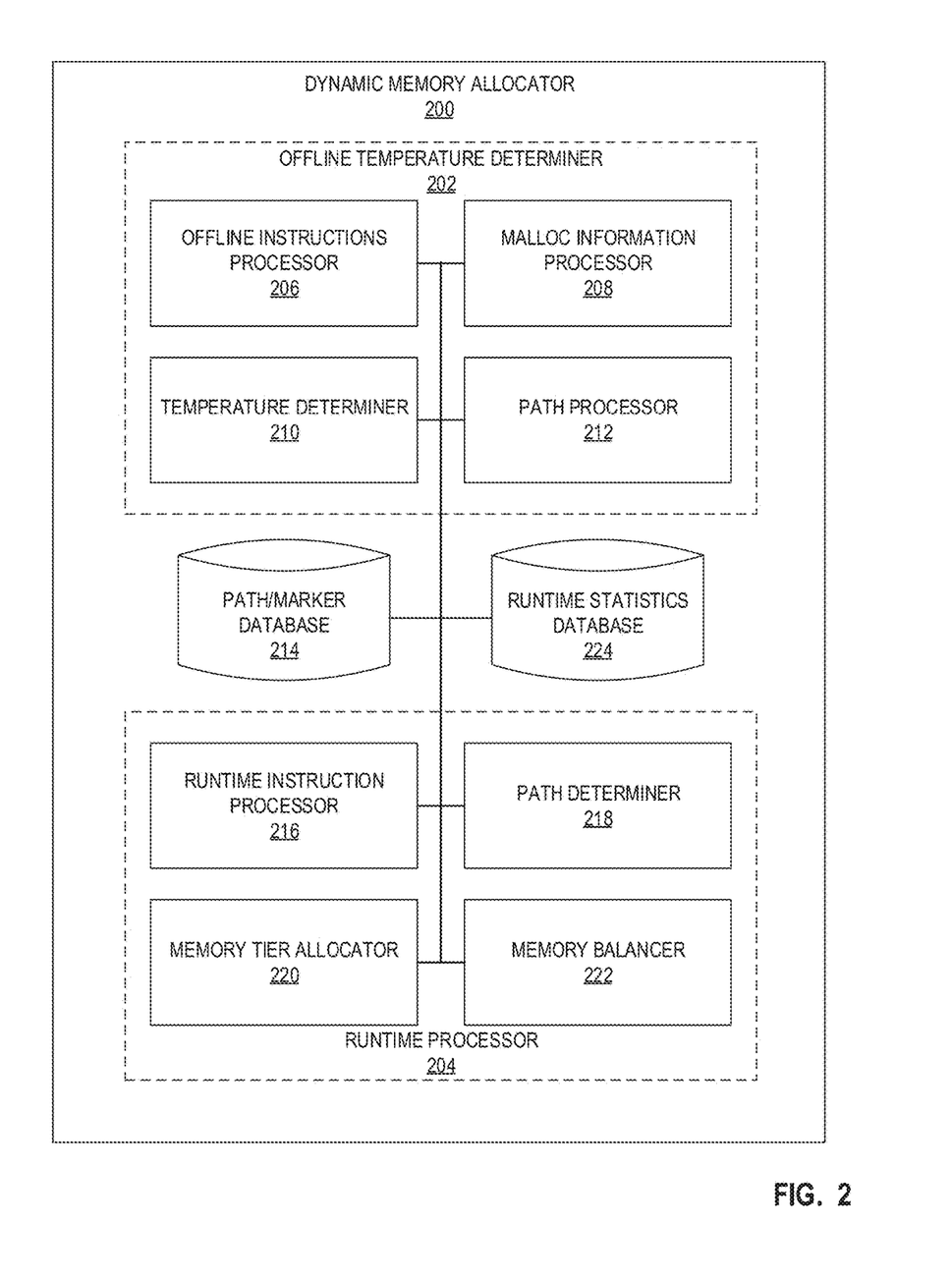
FIG. 2 is a block diagram of an example dynamic memory allocator to optimize dynamic memory assignments in multi-tiered memory systems.

FIG. 2 is a block diagram of an example dynamic memory allocator 200 to optimize dynamic memory assignments in multi-tiered memory systems. The example dynamic memory allocator 200 includes an example offline temperature determiner 202 and an example runtime processor 204. The example offline temperature determiner 202 includes an example offline instructions processor 206, an example malloc information processor 208, an example temperature determiner 210, and an example path processor 212. The example runtime processor 204 includes an example runtime instruction processor 216, an example path determiner 218, an example memory tier allocator 220, and an example memory balancer 222. The example dynamic memory allocator 200 further includes an example path/marker database 214 and an example runtime statistics database 224.

The example offline temperature determiner 202 of FIG. 2 determines how the markers 112 of FIG. 1 are made and how offline estimation of the popularity of buffers malloced by different paths is performed (e.g., the path temperature determination of mallocs). The example offline instructions processor 206 executes offline profile runs of the application (e.g., prior to runtime) so that the malloc information processor 208 can identify all malloc function call paths (e.g., all function paths preceding a malloc function call).

The example malloc information processor 208 of FIG. 2 gathers information related to the paths preceding a malloc function call and information corresponding to the offline malloc function call. For example, the malloc information processor 208 uses a backtrace function call at malloc to identify all malloc function call paths that occur during the set of offline pilot runs of an application. Additionally, the example the malloc information processor 208 collects the sizes of the buffers being allocated by each malloc function call, to generate a collection of paths and a proportion of capacity that each path allocates.

The example temperature determiner 210 of FIG. 2 determines the buffer temperatures and path temperatures. As described above, the buffer temperature is the average fraction of accesses received by a malloced buffer relative to the size of a malloced buffer (e.g., normalized to total number of accesses across all malloced buffers). In some examples, the temperature determiner 210 can perform a precise event-based sample at low latency (PEBS_LL) and an all-stores linear addresses data collection using phasor measure unit (PMU) for each buffer to identify the buffer temperatures. The example temperature determiner 210 uses tagged buffers to compute the relative path temperatures for each of the identified malloced paths. As described above, the path temperature is a real value (e.g., over interval [0,1] that is proportional to a capacity-normalized number of references to all buffers allocated via an allocation path). In some examples, the proportionality constant is chosen so that the sum of temperatures is almost equal to one.

The example path processor 212 of FIG. 2 processes paths (e.g., the set of paths Q) identified by the malloc information processor 208 to filter out the set of paths, Q. For example, the path processor 212 may filter out all paths whose temperatures are below some threshold (e.g., a buffer temperature threshold). Filtering out low temperature buffers achieves a large scale data reduction (e.g., typically hot/warm subsets are allocated from a relatively small number of paths). Additionally the example path processor 212 may filter out paths whose relative capacity allocation is above some threshold (e.g., a capacity threshold). The remaining set of paths (e.g., the set of paths P) are considerations for upper tiers because they do not allocate too much capacity (e.g., which may overwhelm lower latency/higher bandwidth tiers) and which are reasonably popular when malloced.

The example path processor 212 of FIG. 2 identifies a set of markers from the filtered out set of paths, P. For example, the path processor 212 may generate a marker set, M, based on the characteristics of the filtered out set of paths. If a path does not intersect any other path (e.g., a non-intersecting path), the path processor 212 adds an outermost vertex (e.g., function) of the path to the marker set, M. If a path has at least one vertex that does not correspond to any other path in the set, P, the path processor 212 adds the outermost vertex of the at least one vertex that does not correspond to any other path to the marker set, M. If a path ($P_A$) traverses through vertices that are all traversed by another path in the set of paths, P, the path processor 212 generates a vertex set based on the innermost and outermost vertices of the path, $P_A$. Additionally, the path processor 212 adds the outermost intersection of the path ($P_A$) with a second path ($P_B$) to the vertex set if there is an intersection between $P_A$ and $P_B$. After adding vertexes to the vertex set, the path processor 212, for each pair of distinct vertices (x, y) in the vertex set such that Pathset(x)==Pathset (y), removes the inner of the two vertices (x, y) from the vertex set. Once removed, the path processor 212 adds the vertex set to the markers set to finalize the set of markers, M.

Once the set of markers are finalized, the example path processor 212 traces each path to determine which markers belong to each path. In some examples, the path processor 212 lists all markers in ascending order of addresses and assigns a marker code (e.g., 64-bit marker code) M(k) to a marker of number k (e.g., a murmurhash3 for marker k). The path processor 212 generates path signatures for the set of paths, based on the marker code of the set of markers traced to each path. For example, if path A has x markers (e.g., a1, a2, . . . ax) traced to it, the path processor 212 generates the path signature to be $S_A$=M(a1)|M(a2)| . . . |M(ax). In some examples, the path processor 212 performs an automated source code transmission so that each marker m in source code corresponds to an inline instruction to emit "OR M(m), V", where V is the per-thread path signature variable that is maintained in a thread-private variable, U. In some examples, where source code is not available, the path processor 212 may splice a few instructions in to compute path signatures on the way to malloc (e.g., through binary editing).

In some example, the path processor 212 of FIG. 2 may transform malloc entry code to (A) recover a computer signature (e.g., clear V), and (B) perform a tier selection and buffer tagging. For tier selection, the example path processor 212 links functions F2 and F3, where F2 uses the path temperatures and available capacities in each tier and F3 uses path temperatures, available capacities, and average buffer longevities. The path processor 212 may determine buffer longevities by adding a timestamp tag with each malloced buffer at malloc time, using the tag to then compute its time alive at the time free gets called, and adding the computed time alive to the total live time associated with the path that is tagged. In some examples, the path processor 212 keeps a number of buffers freed with the path, so that the average lifetime can be obtained.

The example path/marker database 214 of FIG. 2 stores the path signatures generated by the example offline temperature determiner 202 in association with the determined temperatures. In this manner, during runtime, when a malloc is called, the runtime processor 204 can determine which markers were traversed prior to the malloc function call and identify a path temperature based on a path signature and temperature corresponding to the traversed markers and allocate memory accordingly.

The example runtime processor 204 of FIG. 2 executes the application at runtime and, when a malloc is called, determines the path preceding the malloc, compares the path to a path signature stored in the path/marker database 214, determines the corresponding path temperature, and allocates memory based on the determined path temperature. The example runtime processor 204 includes the example runtime instruction processor 216 to execute the instructions of an application/processor during runtime.

The example path determiner 218 of FIG. 2 finds a stack backtrace when a malloc is called during runtime. A backtrace function provides the markers that were traversed preceding the malloc function call. For example, at each marker site, the path determiner 218 may generate a Bloom filter update into a signature (e.g., a 64-bit signature) that is maintained on a per-thread basis. The variable that has the signature can be kept at a location that is at the base of the thread's stack. Thus, the signature can be directly computed from the stack pointer (RSP) memory, or may be maintained by some other means, (e.g., a thread local storage variable). In this manner, as software traverse through markers at runtime, the preambles of the code locations Bitwise ORs in Bloom hash function (mumurhash3) into a path signature, and, by construction the bloom hash of the path is equal to the intersection of the bloom hashes of the markers. The example path determiner 218 may clear the path signature variable at malloc points for future use.

The example memory tier allocator 220 of FIG. 2 selects a tier of memory from which to allocate memory during a malloc function call based on the path temperatures determined offline corresponding to the markers traversed prior to the malloc function call. For example, when the malloc is called, the memory tier allocator 220 matches the traversed markers prior to the malloc function call (e.g., determined by the path determiner 218) to a path signature stored in the path/marker database 214. Because the stored path signatures correspond to path temperatures, the memory tier allocator 220 determines the temperature of the path corresponding to the malloc function call based on the temperature of the stored path signature (e.g., hot to tier 1, warm to tier 2, cold to tier 3, etc.). In some examples, the memory tier allocator 220 attempts to select a tier or memory based on the capacity of the tiers. For example, if a malloc function call corresponds to a warm path, the example memory tier allocator 220 may select the first tier (e.g., the highest tier) if the first tier has capacity to handle the allocation.

The example memory balancer 222 of FIG. 2 tracks associations between buffer allocations and selected tiers. For example, if buffer B is allocated from a particular tier based on a particular path p, the example memory balancer 222 stores an association between buffer B and path p in the example runtime statistics database 224. In this manner, the memory balancer 22 can track the popularity of the buffers allocated by path p. In some examples, the memory balancer 222 may determine that memory rebalancing needs to be performed across tiers based on the runtime statistics of the runtime statistics database 224. For example, if a malloc should have been mapped to tier 1, but the capacity of tier 1 was insufficient, the memory balancer 222 can use the runtime statistics in the runtime statistics database 224 to perform a memory balancing by possibly returning any capacity it may be caching in tier 1. The memory balancer 222 may maintain a popularity indicator for each path, that may be updated by PMU feedback (e.g., through PEBS sampling of precise load and store events). The memory balancer 222 samples to determine the linear addresses of frequently referenced memory, maps the linear addresses back to buffer address, and updates the touch-statistics for paths in the runtime statistics database 224 by the association. To keep mapping efficiently, the memory balancer 222 may employ various techniques (e.g., employ hidden regions around memory, update a hash, employ different arenas for different paths to maintain popularity on an arena by arena basis, etc.).

While an example manner of implementing the dynamic memory allocator 200 of FIG. 2 is illustrated in FIG. 2, one or more of the elements, processes and/or devices illustrated in FIG. 2 may be combined, divided, re-arranged, omitted, eliminated and/or implemented in any other way. Further, the example offline instructions processor 206, the example malloc information processor 208, the example temperature determiner 210, the example path processor 212, the example runtime instruction processor 216, the example path determiner 218, the example memory tier allocator 220, the example memory balancer 222 and/or, more generally, the example dynamic memory allocator 200, the example offline temperature determiner 202, and/or the example runtime processor 204 of FIG. 2 may be implemented by hardware, software, firmware and/or any combination of hardware, software and/or firmware. Thus, for example, any of the example offline instructions processor 206, the example malloc information processor 208, the example temperature determiner 210, the example path processor 212, the example runtime instruction processor 216, the example path determiner 218, the example memory tier allocator 220, the example memory balancer 222 and/or, more generally, the example dynamic memory allocator 200, the example offline temperature determiner 202, and/or the example runtime processor 204 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example offline instructions processor 206, the example malloc information processor 208, the example temperature determiner 210, the example path processor 212, the example runtime instruction processor 216, the example path determiner 218, the example memory tier allocator 220, and/or the example memory balancer 222 is/are hereby expressly defined to include a non-transitory computer readable storage device or storage disk such as a memory, a digital versatile disk (DVD), a compact disk (CD), a Blu-ray disk, etc. including the software and/or firmware. Further still, the dynamic memory allocator 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
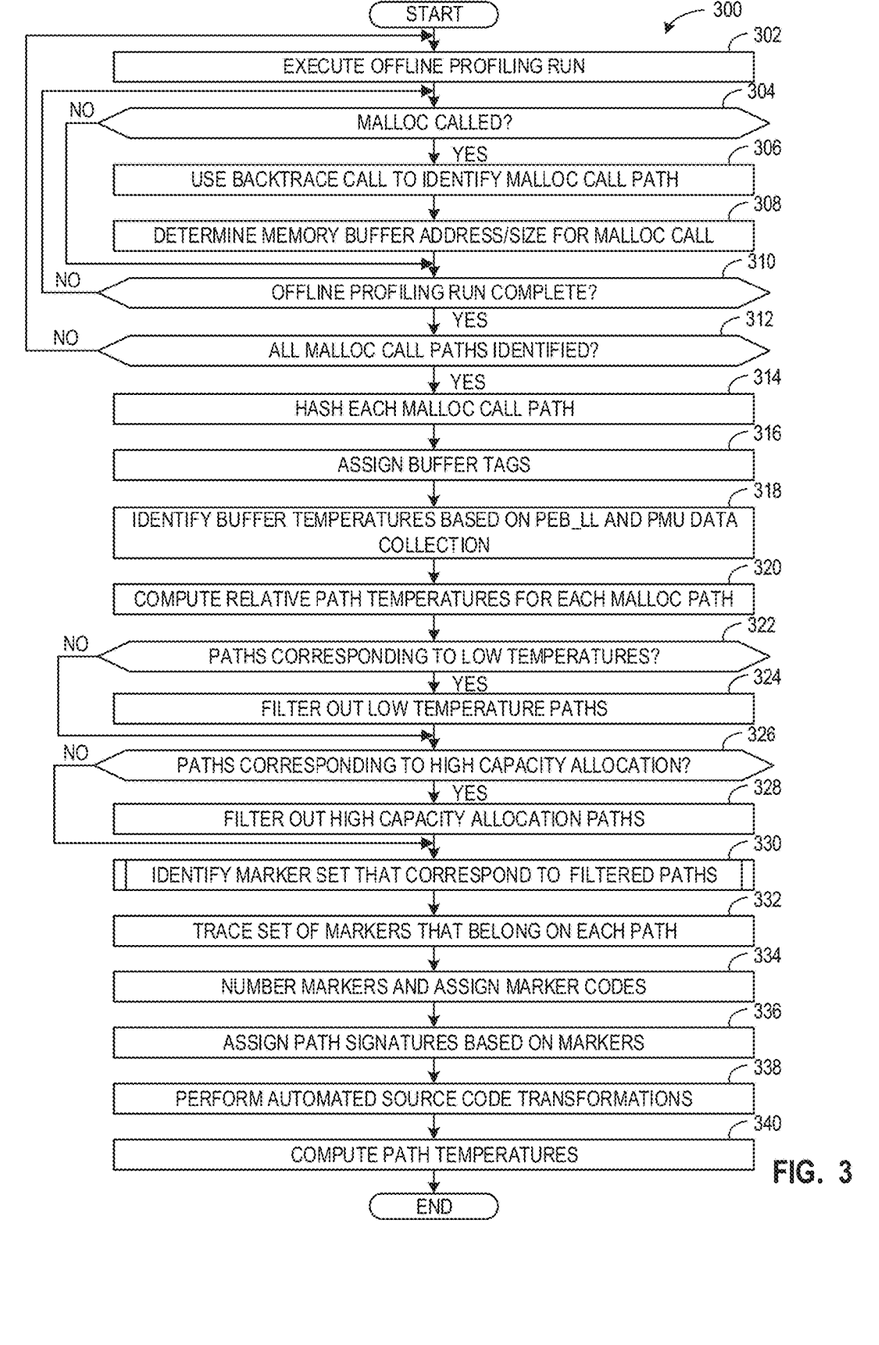
FIGS. 3-5 are flowcharts representative of machine readable instructions which may be executed to implement the example dynamic memory allocator of FIG. 2.
Figure 4:
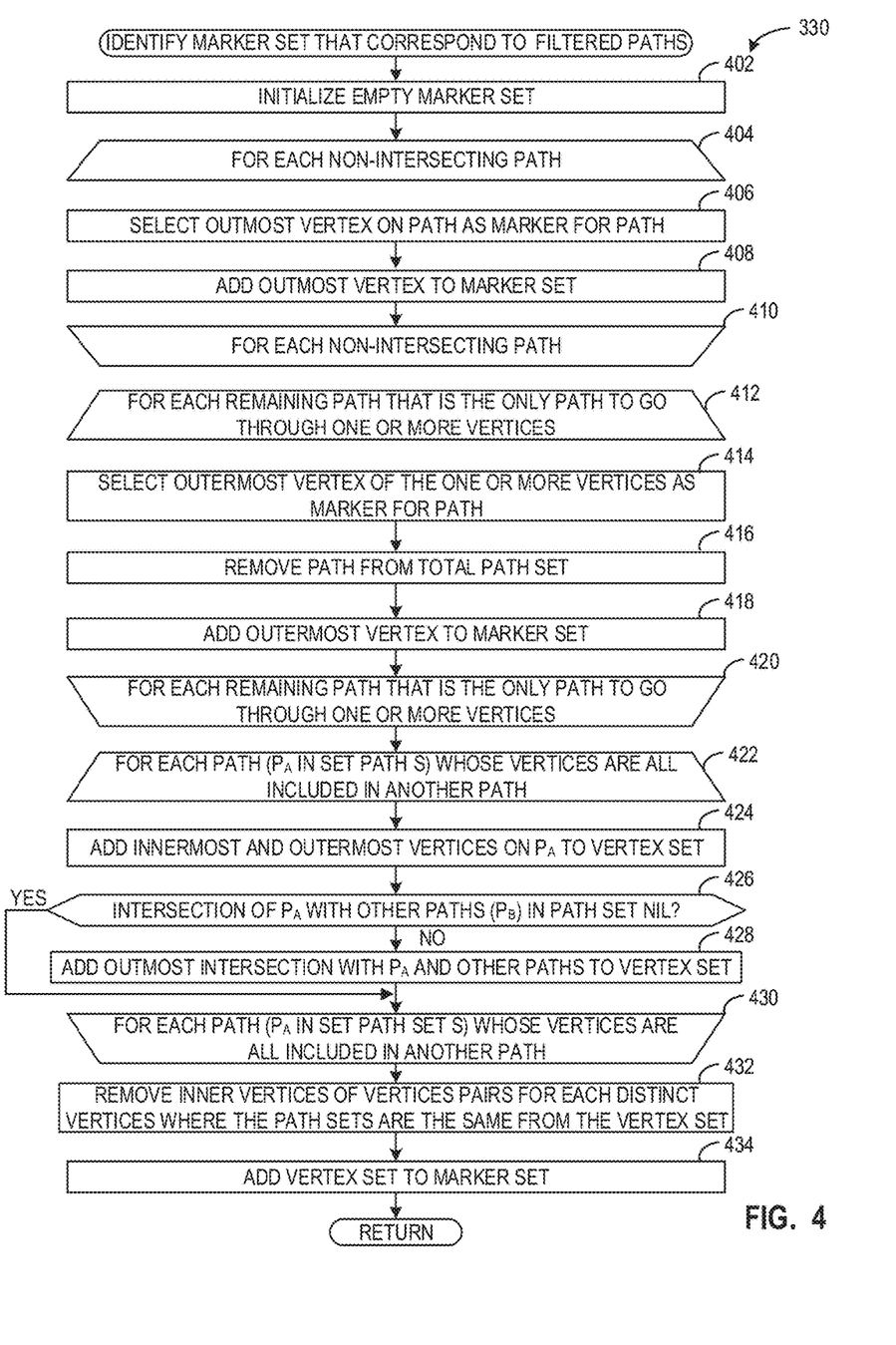
Figure 5:
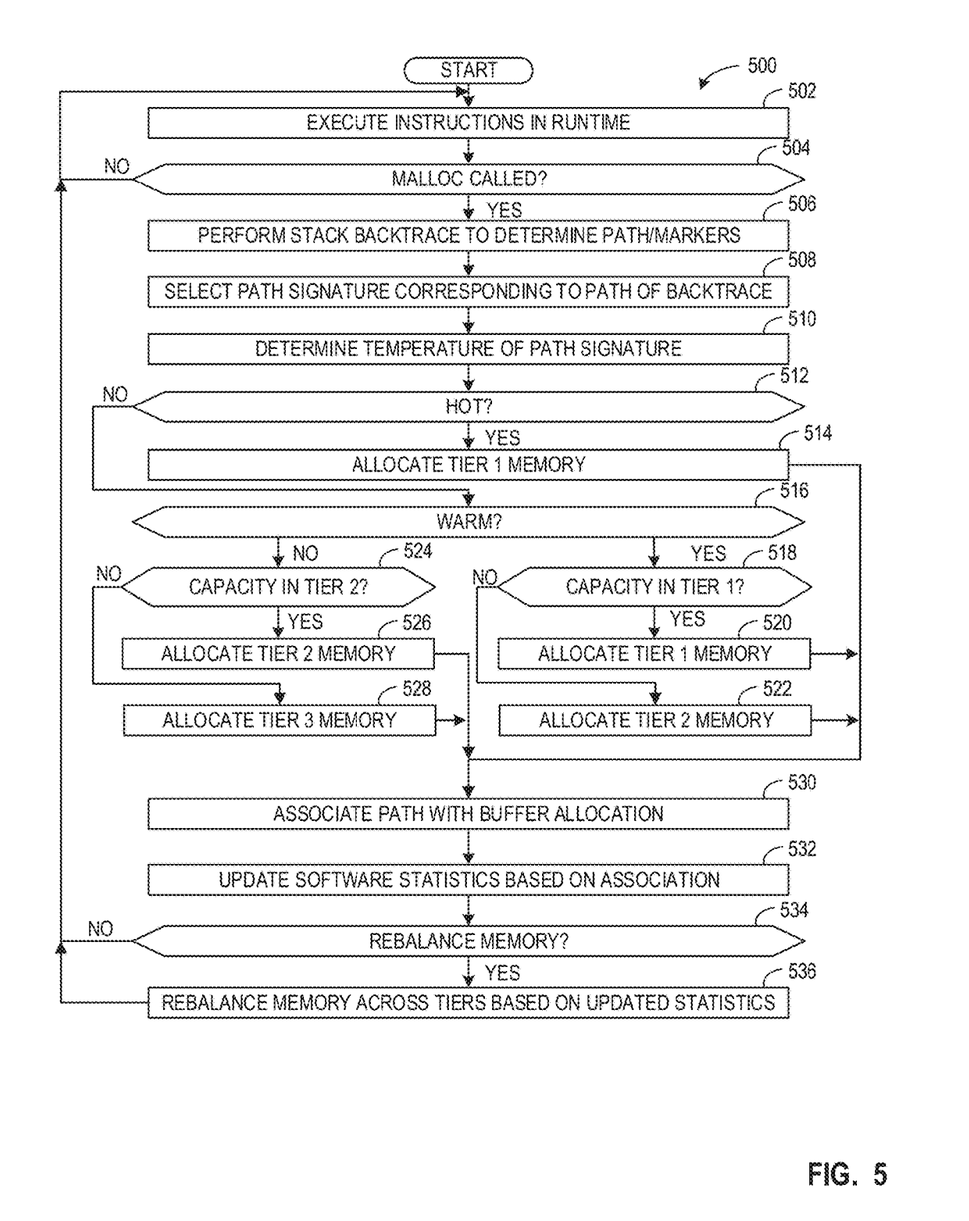

A flowchart representative of example hardware logic, machine readable instructions, hardware implemented state machines, and/or any combination thereof for implementing the dynamic memory allocator 200 of FIG. 2 is shown in FIGS. 3-5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 3-5, many other methods of implementing the example the dynamic memory allocator 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 illustrates an example flowchart 300 representative of example machine readable instructions that may be executed by the dynamic memory allocator 200 of FIG. 2 during one or more offline profile run to determine path signature and temperatures. At block 302, the example offline instructions processor 206 executes an offline profiling run of an application. At block 304, the example offline instruction processor 206 determines if a malloc was called during the offline profiling run. If the example offline instructions processor 206 determines that a malloc has not been called (block 304: NO), the process continues to block 310, as further described below.

If the example offline instruction processor 206 determines that a malloc has been called (block 304: YES), the example malloc information processor 208 uses a backtrace call to identify malloc function call path (e.g., the functions executed prior to the malloc function call) (block 306). At block 308, the example malloc information processor 208 determines the memory buffer address and/or size allocated for the malloc function call. At block 310, the example offline instructions processor 206 determines if the offline profiling run is complete. If the offline instructions processor 206 determines that the offline profiling run is not complete (block 310: NO), the process returns to block 304 to continue to execute the offline profiling run.

If the offline instructions processor 206 determines that the offline profiling run is complete (block 310: YES), the malloc information processor 208 determines if all malloc function call paths have been identified (block 312). In some examples, the offline instructions processor 206 may perform only one offline profiling run, regardless of the number of malloc path calls identified. For example, a user or manufacturer may determine that it is sufficient to identify a subset of all malloc function calls during a single offline profile run. Accordingly, the number of offline runs/identified malloc paths may be based on user and/or manufacturer preferences. If the example malloc information processor 208 determines that all malloc function call paths have not been identified (block 312: NO), the process returns to block 302 to rerun the offline profiling run. If the example malloc information processor 208 determines that all malloc function call paths have been identified (block 312: YES), the example path processor 212 hashes each malloc function call path (e.g., a 64-bit hash for each path) (block 314). At block 316, the example path processor 212 assigns a buffer tag with each allocated buffer using the hashed paths.

At block 318, the example temperature determiner 210 identifies the temperatures of the malloced buffers by performing a PEB_LL function and a PMU data collection. The buffer temperatures may be translated into path temperatures, as further described below in conjunction with block 340. For example, an application's behavior may slowly veer away from that which the offline determination captured. Accordingly, block 340, may be performed to recompute path temperatures from a fresh capture of the buffer temperatures. At block 320, the example temperature determiner 210 determines the relative path temperatures (e.g., determining an indicator representative of temperature) for each malloc path using the tagged buffers (e.g., the higher the aggregate temperature of the buffers tagged by a given malloc path, the higher the path's temperature is compared to the other paths). At block 322, the example path processor 212 determines if there are paths from the set of malloced paths that correspond to temperatures below a buffer temperature threshold. If the example path processor 212 determines that there are paths that do not correspond to temperatures below a buffer threshold (block 322: NO), the process continues to block 326. If the example path processor 212 determines that there are paths that correspond to temperatures below a buffer threshold (block 322: YES) the path processor 212 filters out the low temperature paths (e.g., the malloc paths below the buffer temperature threshold) (block 324).

At block 326, the example path processor 212 determines if there are paths from the set of malloced paths that correspond to high capacity allocations (e.g., above a capacity allocation threshold). If the example path processor 212 determines that there are paths that do not correspond to high capacity allocations (block 326: NO), the process continues to block 330. If the example path processor 212 determines that there are paths that correspond to high capacity allocations (block 322: YES) the path processor 212 filters out the high capacity allocation paths (e.g., the malloc paths above the capacity allocation threshold) (block 328).

At block 330, the example path processor 212 identifies markers corresponding to (e.g., that uniquely identify) the filtered paths (e.g., the example markers 112 of FIG. 1), as further described below in conjunction with FIG. 4. At block 332, the example path processor 212 traces the set of markers that belong to each filtered path. At block 334, the example path processor 212 numbers the markers and assigns marker codes. For example, the path processor 212 may list all the markers in ascending order of address and number them 1, 2, . . . , n. In this manner, the path processor 212 can assign to a maker whose number is k, a 64-bit marker code M(k).

At block 336, the example path processor 212 assigns path signatures based on the markers, as further described above in conjunction with FIG. 2. At block 338, the example path processor 212 performs automated source code transformations so that for each marker m in the source code, there is an inline instruction to emit "OR M(m), V'", where V is the per-thread path signature variable that is maintained in a thread-private variable. The makers, path signatures and corresponding temperatures are stored in the example path/marker database 214 for use during runtime, as further described below in conjunction with the flowchart of FIG. 5.

At block 340, the example temperature determiner 210 computes the path temperatures of the filtered paths. Block 340 is a refining of path temperatures based on realtime runs performed by the example runtime processor 204 and/or subsequent iterations of profiling runs and/or real time runs (e.g., which may be performed offline or in realtime). Accordingly, the example temperature determiner 210 achieves progressively better estimations of the path temperatures by building upon past calibration and/or path determination during previous offline or realtime runs. In this manner, path temperatures are reflective of the actual (e.g., even if gradual) evolution in the memory behavior of an application as the data it is presented with, or the mix of computational work it is being asked to perform changes over the course of time. For example, the example temperature determiner 210 may determine path temperature at a first time using a pattern of queries or operations that an application (e.g., a health records manager) is asked to perform. In such an example, at a second time after the first time, the actual mix of queries changes and the mix of health-records being managed evolves because a company has diversified into multiple geographies. Accordingly, the example temperature determiner 210 may recompute the memory behaviors (e.g., path temperatures) without repeating blocks 302-320.

FIG. 4 illustrates an example flowchart 330 representative of example machine readable instructions that may be executed by the dynamic memory allocator 200 of FIG. 2 to identify marker sets that correspond to the filtered paths, as further described above in conjunction with block 330 of FIG. 3. At block 402, the example path processor 212 initializes an empty marker set, M. For each non-intersecting path (e.g., each path that does not perform a same function as any other path in the filtered set of paths) (blocks 404-410), the example path processor 212 selects the outermost vertex on the path as a marker for the path (block 406) and adds the selected outermost vertex to the marker set, M (block 408).

For each remaining path that is only path to go through one or more vertices (e.g., a path P that is the only path to go through at least vertex v) (block 412-420), the example path processor 212 selects the outermost vertex of the one or more vertices as a marker for the path (block 414), removes the path from the total path set (block 416), and adds the selected outermost vertex to the marker set, M (block 418).

For each path ($P_A$ in the set path S) whose vertices are all included in at least one other path (block 422-430), the example path processor 212 adds the innermost and the outermost vertices on path $P_A$ to a vertex set, V (block 424). At block 426, the example path processor 212 determines if the intersection of path $P_A$ with other paths $P_B$ in the path set S are nil ($I(P_A, P_B)$=nil). If the example path processor 212 determines that the intersection of the path $P_A$ with other paths $P_B$ in the set S are nil (block 426: YES), the process continues to block 430. If the example path processor 212 determines that the intersection of the path $P_A$ with other paths $P_B$ in the set S are not nil (block 426: NO), the example path processor 212 adds the outermost intersection with $P_A$ and $P_B$ to the vertex set, V (block 428).

At block 432, the example path processor 212 removes the inner vertices of the two vertices pairs (x, y) from V for each distinct vertices (x, y) in V where the pathsets are the same from the vertex set (e.g., pathsets(x)=pathset(y)). At block 434, the example path processor 212 adds the generated vertex set to the marker set, M, and the process continues to block 332 of FIG. 3.

FIG. 5 illustrates an example flowchart 500 representative of example machine readable instructions that may be executed by the dynamic memory allocator 200 of FIG. 2 during runtime to allocate memory based on a malloc function call. Although FIG. 5 is described in conjunction with three tiers and three temperatures, FIG. 5 may be implemented for any number of temperatures with any number of tiers.

At block 502, the example runtime instruction processor 216 executes instructions of the application/program at runtime. At block 504, the example runtime instruction processor 216 determines if a malloc is called during runtime. If the example runtime instruction processor 216 determines that a malloc has not been called during runtime (block 504: NO), the process returns to block 502 to continue to execute instructions until a malloc is called.

If the example runtime instruction processor 216 determines that a malloc has been called during runtime (block 504: YES), the example path determiner 218 performs a stack backtrace to identify the path/makers traversed preceding the malloc function call (block 506). For example, the path determiner 218 may perform a stack backtrace to identify the markers that were traversed prior to the malloc function call, as further described above in conjunction with FIG. 2. At block 508, the example memory tier allocator 220 access the path/marker database 214 to access a path signature from the example path/marker database 214 that matches the markers identified during the backtrace function. At block 510, the example memory tier allocator 220 determines the temperature of the selected path signature from the path/marker database 214.

At block 512, the example memory tier allocator 220 determines if the determined path temperature is hot. If the example memory tier allocator 220 determines that the determined temperature is not hot (block 512: NO), the process continues to block 516, as further described below. If the example memory tier allocator 220 determines that the determined temperature is hot (block 512: YES), the example memory tier allocator 220 allocates tier 1 memory (e.g., the highest memory corresponding to low latency and high bandwidth) (block 514). In some examples, if the tier 1 is not available (e.g., not enough capacity), the example memory tier allocate will allocate memory from the next highest tier. In such examples, the memory balancer 22 may trigger a memory balance to allocate more tier 1 memory, as further described below in at block 536. At block 516, the example memory tier allocator 220 determines if the determined path temperature is warm. If the example memory tier allocator 220 determines that the determined path temperature is warm (block 516: YES), the example memory tier allocator 220 determines if there is capacity in tier 1 (e.g., the highest tier) to handle the allocation of memory for the malloc corresponding to the warm path (block 518).

If the example memory tier allocator 220 determines that there is capacity in tier 1 (block 518: YES), the example memory tier allocator 220 allocates tier 1 memory for the malloc function call (block 520). If the example memory tier allocator 220 determines that there is not capacity in tier 1 (block 518: NO), the example memory tier allocator 220 allocates tier 2 memory for the malloc function call (block 522). If tier 2 is unavailable (e.g., does not have enough capacity to allocate memory) tier 3 may be used. If the example memory tier allocator 220 determines that the determined path temperature is not warm (e.g., the path is cold) (block 516: NO), the example memory tier allocator 220 determines if there is capacity in tier 2 (e.g., the medium tier) to handle the allocation of memory for the malloc corresponding to the cold path (block 524). If the example memory tier allocator 220 determines that there is capacity in tier 2 (block 524: YES), the example memory tier allocator 220 allocates tier 2 memory for the malloc function call (block 526). If the example memory tier allocator 220 determines that there is not capacity in tier 2 (block 524: NO), the example memory tier allocator 220 allocates tier 3 memory for the malloc function call (block 528).

At block 530, the example memory balancer 222 generates an association of the path with the buffer allocation. As described above in conjunction with FIG. 2, the memory balancer 222 generates the association as part of a long-term feedback that may be used by to rebalance memory across tiers. At block 532, the example memory balancer 222 updates the statistics in the example runtime statistics database 224 based on the association. At block 524, the example memory balancer 222 determines if a balancing of memory is needed/desired. The memory balancer 222 may rebalance memory when, for example, a hot path is not allocated to a highest tier (e.g., tier 1) and/or a warm path is allocated to a lower tier then expected (e.g., tier 3), because there is not enough capacity in the corresponding tier. In some examples, the memory balancer 22 may rebalance memory when un unexpected number of path/buffer allocation associations is generated. If the example memory balancer 222 determines that a rebalance of memory is not desired (block 534: NO), the process returns to block 502 to continue to execute instructions at runtime. If the example memory balancer 222 determines that a rebalance of memory is desired (block 534: YES), the memory balancer 222 rebalances the memory across tiers based on the updated statistics in the example runtime statistics database 224 (block 536).

Figure 6:
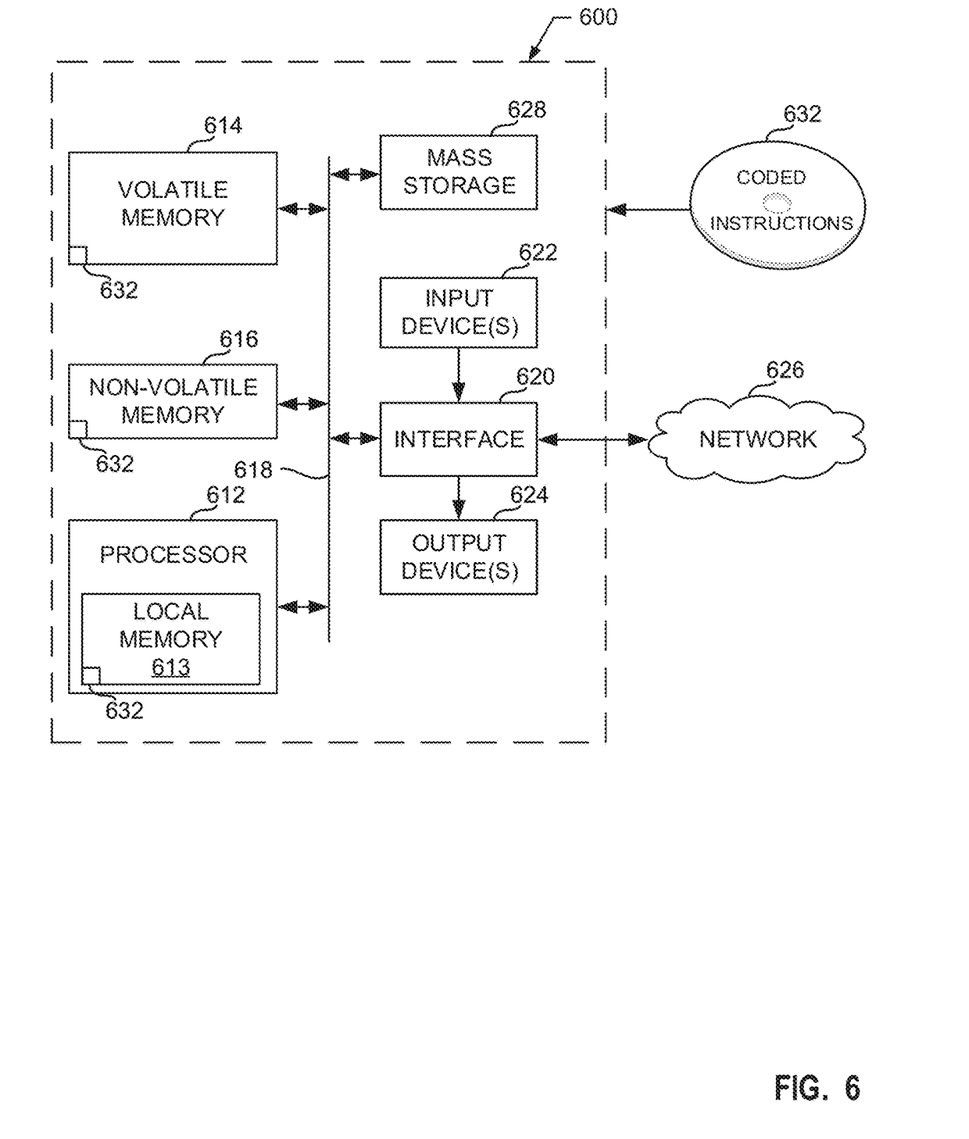
FIG. 6 is a block diagram of an example processing platform structured to execute the instructions of FIGS. 3-5 to implement the dynamic memory allocator of FIG. 2.

FIG. 6 is a block diagram of an example processor platform 600 structured to execute the instructions of FIGS. 3-5 to implement the dynamic memory allocator 200 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example offline instructions processor 206, the example malloc information processor 208, the example temperature determiner 210, the example path processor 212, the example runtime instruction processor 216, the example path determiner 218, the example memory tier allocator 220, and/or the example memory balancer 222 of FIG. 2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller. Any one of the example volatile memory 614, the example non-volatile memory 616, and/or the example local memory 613 may be used to implement the example path/marker database 214, and/or the example runtime statistics database 224.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

Example 1 includes a non-transitory computer readable storage medium comprising executable computer program instructions which, when executed, cause a machine to at least during an offline profiling run of a computer application responsive to a first malloc function call, perform a first backtrace to identify a first path preceding the first malloc function call and identify a size of a buffer in memory allocated to the first path, and determine an indicator corresponding to a temperature of the buffer allocated to the first path, and during runtime responsive to a second malloc function call, perform a second backtrace to identify a second path preceding the second malloc function call, and responsive to the second path corresponding to the first path, allocate memory from a tier of memory based on the indicator.

Example 2 includes the computer readable storage medium of example 1, wherein responsive to the indicator corresponding to a first temperature, the tier of memory is a first tier corresponding to at least one of a first latency and a first bandwidth, and responsive to the indicator corresponding to a second temperature lower than the first temperature, the tier of memory is a second tier corresponding to at least one of a second latency higher than the first latency and a second bandwidth lower than the first bandwidth.

Example 3 includes the computer readable storage medium of example 2, wherein the instructions cause the machine to, responsive to the indicator corresponding to the second temperature and the first tier has capacity to allocate memory, allocate memory from the first tier of memory.

Example 4 includes the computer readable storage medium of example 1, wherein the instructions cause the machine to store a correspondence between the first path and the temperature in a database during the offline profiling run, and determine that the second path corresponds to the first path by comparing the second path with the first path.

Example 5 includes the computer readable storage medium of example 1, wherein the instructions cause the machine to, during the offline profiling mode assign a buffer tag to the buffer, compute a path temperature for the first path relative to other paths corresponding to other malloc function calls determined during the offline profiling run based on the buffer tag, determine a set of markers corresponding to the other paths, trace the set of markers to that belong on the first path, assign a path signature to the first path based on the traced set of markers, and store the path signature with the path temperature in a database.

Example 6 includes the computer readable storage medium of example 1, wherein the instructions cause the machine to, during the offline profiling run, filter out at least one of malloced paths that correspond to a low temperature or malloced paths that correspond to high capacity allocations.

Example 7 includes the computer readable storage medium of example 1, wherein the instructions cause the machine to, responsive to the tier of memory being unavailable, rebalance the memory across tiers of the memory.

Example 8 includes the computer readable storage medium of example 1, wherein the indicator corresponding to the temperature corresponds to a frequency that the buffer allocated to the first path will be accessed by the computer application.

Example 9 includes an apparatus to perform dynamic memory assignments in multi-tiered memory systems, the apparatus comprising a malloc information processor to, during an offline profiling run of a computer application, perform a first backtrace responsive to a first malloc function call to identify a first path preceding the first malloc function call and identify a size of a buffer in memory allocated to the first path, a temperature determiner to determine an indicator corresponding to a temperature of the buffer allocated to the first path, a path determiner to, during runtime, perform a second backtrace responsive to a second malloc function call to identify a second path preceding the second malloc function call, and a memory tier allocator to, responsive to the second path corresponding to the first path, allocate memory from a tier of memory based on the indicator.

Example 10 includes the apparatus of example 9, wherein responsive to the indicator corresponding to a first temperature, the tier of memory is a first tier corresponding to at least one of a first latency and a first bandwidth, and responsive to the indicator corresponding to a second temperature lower than the first temperature, the tier of memory is a second tier corresponding to at least one of a second latency higher than the first latency and a second bandwidth lower than the first bandwidth.

Example 11 includes the apparatus of example 10, wherein the memory tier allocator is to, responsive to the indicator corresponding to the second temperature and the first tier has capacity to allocate memory, allocate memory from the first tier of memory.

Example 12 includes the apparatus of example 9, further including a database to store a correspondence between the first path and the temperature during the offline profiling run, the memory tier allocator to determine that the second path corresponds to the first path by comparing the second path with the first path.

Example 13 includes the apparatus of example 9, further including a path processor to, during the offline profiling mode, assign a buffer tag to the buffer, the temperature determiner to compute a path temperature for the first path relative to other paths corresponding to other malloc function calls determined during the offline profiling run based on the buffer tag, the path processor to determine a set of markers corresponding to the other paths, trace the set of markers to that belong on the first path, and assign a path signature to the first path based on the traced set of markers, and a database to store the path signature with the path temperature.

Example 14 includes the apparatus of example 9, further including a path processor to, during the offline profiling run, filter out at least one of malloced paths that correspond to a low temperature or malloced paths that correspond to high capacity allocations.

Example 15 includes the apparatus of example 9, further including a memory balancer to, responsive to the tier of memory being unavailable, rebalance the memory across tiers of the memory.

Example 16 includes the apparatus of example 9, wherein the indicator corresponding to the temperature corresponds to a frequency that the buffer allocated to the first path will be accessed by the computer application.

Example 17 includes a method to perform dynamic memory assignments in multi-tiered memory systems, the method comprising during an offline profiling run of a computer application responsive to a first malloc call function, performing a first backtrace to identify a first path preceding the first malloc function call and identify a size of a buffer in memory allocated to the first path, and determining an indicator corresponding to a temperature of the buffer allocated to the first path, and during runtime responsive to a second malloc function call, performing a second backtrace to identify a second path preceding the second malloc function call, and responsive to the second path corresponding to the first path, allocating memory from a tier of memory based on the indicator.

Example 18 includes the method of example 17, wherein responsive to the indicator corresponding to a first temperature, the tier of memory is a first tier corresponding to at least one of a first latency and a first bandwidth, and responsive to the indicator corresponding to a second temperature lower than the first temperature, the tier of memory is a second tier corresponding to at least one of a second latency higher than the first latency and a second bandwidth lower than the first bandwidth.

Example 19 includes the method of example 18, further including, responsive to the indicator corresponding to the second temperature and the first tier has capacity to allocate memory, allocating memory from the first tier of memory.

Example 20 includes the method of example 17, further including storing a correspondence between the first path and the temperature in a database during the offline profiling run, and determining that the second path corresponds to the first path by comparing the second path with the first path.

From the foregoing, it will be appreciated that example methods, apparatus and articles of manufacture have been disclosed that optimize dynamic memory assignments in multi-tiered memory systems. Working with multitiered memories and allocating memory for each tier may be a complex undertaking since conventionally software was developed with memory handling being transparent, and a lot of low-level optimization being focused in speciated code (e.g., slab allocators). Even if some objects are hot, they may be ill suited to place in upper tiers if the upper tiers are very capacity constrained. Examples disclosed herein simplifies the process of multi-tiered memory optimization. Examples disclosed herein chooses the optimal tier for malloc, based on past behavior, thereby making the adoption of large capacity and high bandwidth tiers easier and adaptive to dynamic conditions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising executable computer program instructions which, when executed, cause a machine to at least:
 during an offline profiling run of a computer application:
  responsive to a first malloc function call, perform a first backtrace to identify a first path preceding the first malloc function call and identify a size of a buffer in memory allocated to the first path; and
  determine an indicator corresponding to a temperature of the buffer allocated to the first path; and
 during runtime:
  responsive to a second malloc function call, perform a second backtrace to identify a second path preceding the second malloc function call; and
  responsive to the second path corresponding to the first path, allocate memory from a tier of memory based on the indicator.

2. The computer readable storage medium of claim 1, wherein:
 responsive to the indicator corresponding to a first temperature, the tier of memory is a first tier corresponding to at least one of a first latency and a first bandwidth; and
 responsive to the indicator corresponding to a second temperature lower than the first temperature, the tier of memory is a second tier corresponding to at least one of a second latency higher than the first latency and a second bandwidth lower than the first bandwidth.

3. The computer readable storage medium of claim 2, wherein the instructions cause the machine to, responsive to the indicator corresponding to the second temperature and the first tier has capacity to allocate memory, allocate memory from the first tier of memory.

4. The computer readable storage medium of claim 1, wherein the instructions cause the machine to:
 store a correspondence between the first path and the temperature in a database during the offline profiling run; and
 determine that the second path corresponds to the first path by comparing the second path with the first path.

5. The computer readable storage medium of claim 1, wherein the instructions cause the machine to, during the offline profiling mode:
 assign a buffer tag to the buffer;
 compute a path temperature for the first path relative to other paths corresponding to other malloc function calls determined during the offline profiling run based on the buffer tag;
 determine a set of markers corresponding to the other paths;
 trace the set of markers to that belong on the first path;
 assign a path signature to the first path based on the traced set of markers; and
 store the path signature with the path temperature in a database.

6. The computer readable storage medium of claim 1, wherein the instructions cause the machine to, during the offline profiling run, filter out at least one of malloced paths that correspond to a low temperature or malloced paths that correspond to high capacity allocations.

7. The computer readable storage medium of claim 1, wherein the instructions cause the machine to, responsive to the tier of memory being unavailable, rebalance the memory across tiers of the memory.

8. The computer readable storage medium of claim 1, wherein the indicator corresponding to the temperature corresponds to a frequency that the buffer allocated to the first path will be accessed by the computer application.

9. An apparatus to perform dynamic memory assignments in multi-tiered memory systems, the apparatus comprising:
 a malloc information processor to, during an offline profiling run of a computer application, perform a first backtrace responsive to a first malloc function call to identify a first path preceding the first malloc function call and identify a size of a buffer in memory allocated to the first path;
 a temperature determiner to determine an indicator corresponding to a temperature of the buffer allocated to the first path;
 a path determiner to, during runtime, perform a second backtrace responsive to a second malloc function call to identify a second path preceding the second malloc function call; and
 a memory tier allocator to, responsive to the second path corresponding to the first path, allocate memory from a tier of memory based on the indicator.

10. The apparatus of claim 9, wherein:
 responsive to the indicator corresponding to a first temperature, the tier of memory is a first tier corresponding to at least one of a first latency and a first bandwidth; and
 responsive to the indicator corresponding to a second temperature lower than the first temperature, the tier of memory is a second tier corresponding to at least one of a second latency higher than the first latency and a second bandwidth lower than the first bandwidth.

11. The apparatus of claim 10, wherein the memory tier allocator is to, responsive to the indicator corresponding to the second temperature and the first tier has capacity to allocate memory, allocate memory from the first tier of memory.

12. The apparatus of claim 9, further including a database to store a correspondence between the first path and the temperature during the offline profiling run, the memory tier allocator to determine that the second path corresponds to the first path by comparing the second path with the first path.

13. The apparatus of claim 9, further including:
 a path processor to, during the offline profiling mode, assign a buffer tag to the buffer;
 the temperature determiner to compute a path temperature for the first path relative to other paths corresponding to other malloc function calls determined during the offline profiling run based on the buffer tag;

the path processor to:
   determine a set of markers corresponding to the other paths;
   trace the set of markers to that belong on the first path; and
   assign a path signature to the first path based on the traced set of markers; and
a database to store the path signature with the path temperature.

14. The apparatus of claim 9, further including a path processor to, during the offline profiling run, filter out at least one of malloced paths that correspond to a low temperature or malloced paths that correspond to high capacity allocations.

15. The apparatus of claim 9, further including a memory balancer to, responsive to the tier of memory being unavailable, rebalance the memory across tiers of the memory.

16. The apparatus of claim 9, wherein the indicator corresponding to the temperature corresponds to a frequency that the buffer allocated to the first path will be accessed by the computer application.

17. A method to perform dynamic memory assignments in multi-tiered memory systems, the method comprising:
   during an offline profiling run of a computer application:
      responsive to a first malloc call function, performing a first backtrace to identify a first path preceding the first malloc function call and identify a size of a buffer in memory allocated to the first path; and
      determining an indicator corresponding to a temperature of the buffer allocated to the first path; and
   during runtime:
      responsive to a second malloc function call, performing a second backtrace to identify a second path preceding the second malloc function call; and
      responsive to the second path corresponding to the first path, allocating memory from a tier of memory based on the indicator.

18. The method of claim 17, wherein:
   responsive to the indicator corresponding to a first temperature, the tier of memory is a first tier corresponding to at least one of a first latency and a first bandwidth; and
   responsive to the indicator corresponding to a second temperature lower than the first temperature, the tier of memory is a second tier corresponding to at least one of a second latency higher than the first latency and a second bandwidth lower than the first bandwidth.

19. The method of claim 18, further including, responsive to the indicator corresponding to the second temperature and the first tier has capacity to allocate memory, allocating memory from the first tier of memory.

20. The method of claim 17, further including:
   storing a correspondence between the first path and the temperature in a database during the offline profiling run; and
   determining that the second path corresponds to the first path by comparing the second path with the first path.

* * * * *